(12) United States Patent
Nguyen et al.

(10) Patent No.: US 11,619,326 B1
(45) Date of Patent: Apr. 4, 2023

(54) ANTI-VIBRATION MOUNT

(71) Applicant: Cantex International, Inc., Houston, TX (US)

(72) Inventors: Duy D. Nguyen, Cypress, TX (US); Mark J. Adamson, Houston, TX (US); John M. Adamson, Spring, TX (US)

(73) Assignee: Cantex International, Inc., Houstson, TX (US)

( * ) Notice: Subject to any disclaimer, the term of this patent is extended or adjusted under 35 U.S.C. 154(b) by 0 days.

(21) Appl. No.: 16/910,769

(22) Filed: Jun. 24, 2020

Related U.S. Application Data (60) Provisional application No. 62/865,778, filed on Jun. 24, 2019.

(51) Int. Cl.
| | |
|---|---|
| *F16L 3/12* | (2006.01) |
| *E21B 43/26* | (2006.01) |
| *E21B 17/04* | (2006.01) |
| *F16L 55/035* | (2006.01) |
| *F16F 1/38* | (2006.01) |
| *E21B 34/16* | (2006.01) |

(52) U.S. Cl.
CPC ............ *F16L 3/1218* (2013.01); *E21B 17/04* (2013.01); *E21B 43/26* (2013.01); *E21B 43/2607* (2020.05); *F16F 1/3842* (2013.01); *F16L 55/035* (2013.01); *E21B 34/16* (2013.01)

(58) Field of Classification Search
CPC ...... F16F 1/3842; F16F 1/3849; F16F 1/3063; F16F 1/3863; E21B 43/26; E21B 43/2607; E21B 17/04; E21B 34/16; F16L 3/1218
See application file for complete search history.

(56) References Cited

U.S. PATENT DOCUMENTS

| | | | |
|---|---|---|---|
| 6,302,141 B1 | 10/2001 | Markulec et al. | |
| 6,547,440 B2 * | 4/2003 | Testroet | B62D 33/067 384/222 |
| 6,575,247 B2 | 6/2003 | Tolman et al. | |
| 6,874,538 B2 | 4/2005 | Bennett | |
| 7,686,041 B2 | 3/2010 | Eidsmore et al. | |
| 8,376,046 B2 | 2/2013 | Broussard, II | |
| 8,469,108 B2 | 6/2013 | Kajaria et al. | |
| 8,656,990 B2 | 2/2014 | Kajaria et al. | |
| 8,813,836 B2 | 8/2014 | Kajaria et al. | |

(Continued)

OTHER PUBLICATIONS

Cameron, *Frac Manifold Systems—Increase Operational Efficiencies of Simultaneous Completion Operations* (© 2016 Schlumberger).

(Continued)

*Primary Examiner* — Eret C McNichols
(74) *Attorney, Agent, or Firm* — Keith B. Willhelm (57) ABSTRACT

An anti-vibration mount has a base with a cavity. A core extends through the cavity and is coupled at its lower end to the base. A connector is threaded to the core and couples a part subject to vibration to the mount. The base cavity and the core define a receptacle extending around the core. A lower portion of the receptacle is substantially filled with lead. A bushing is carried in the upper portion of the receptacle around the core and bears on the lead. The upper surface of the bushing is elevated above the top surface of the base and bears the load of the part. A resilient body is carried around the connecter and, when the part is coupled to the mount, between the part and a connector head.

13 Claims, 12 Drawing Sheets

(56) References Cited

U.S. PATENT DOCUMENTS

| | | |
|---|---|---|
| 8,950,433 B2 | 2/2015 | Manofsky et al. |
| 8,978,763 B2 | 3/2015 | Guidry |
| 9,127,545 B2 | 9/2015 | Kajaria et al. |
| 9,227,252 B2 | 1/2016 | Horiguchi |
| 9,995,102 B2 | 6/2018 | Dille et al. |
| 10,538,972 B2 | 1/2020 | Hill et al. |
| 10,633,934 B2 | 4/2020 | Hill et al. |
| 10,662,749 B1 | 5/2020 | Hill et al. |
| 10,683,708 B2 | 6/2020 | Hill et al. |
| 11,193,554 B2 * | 12/2021 | Hahn .................. F16F 13/1481 |
| 2007/0114039 A1 | 5/2007 | Hobdy et al. |
| 2010/0300672 A1 | 12/2010 | Childress et al. |
| 2011/0048695 A1 | 3/2011 | Cherewyk et al. |
| 2012/0060929 A1 | 3/2012 | Kendrick |
| 2012/0181016 A1 | 7/2012 | Kajaria et al. |
| 2012/0181030 A1 | 7/2012 | Kajaria et al. |
| 2013/0014947 A1 | 1/2013 | Wilkins et al. |
| 2015/0000766 A1 | 1/2015 | Arizpe et al. |
| 2015/0184491 A1 | 7/2015 | Kajaria et al. |
| 2015/0292297 A1 | 10/2015 | Kajaria et al. |
| 2016/0060997 A1 | 3/2016 | Thomas |
| 2016/0115773 A1 | 4/2016 | Conrad et al. |
| 2017/0123437 A1 | 5/2017 | Boyd et al. |
| 2018/0187507 A1 | 7/2018 | Hill et al. |
| 2018/0187537 A1 | 7/2018 | Hill et al. |
| 2018/0187662 A1 | 7/2018 | Hill et al. |
| 2018/0223640 A1 | 8/2018 | Keihany et al. |

OTHER PUBLICATIONS

Cameron, *Monoline Flanged-Connection Fracturing Fluid Delivery Technology* (© 2016 Schlumberger).

Forum Energy Technologies, *Smart Solutions. Powerful Products*, (undated—print date Jan. 2018) (with undated photos).

* cited by examiner

FIG. 16

ANTI-VIBRATION MOUNT

FIELD OF THE INVENTION

The present invention relates generally to fluid transportation systems and flow lines used in those systems, and especially to chassis-mounted frac manifolds used to convey abrasive, corrosive fluids under high pressure in the oil and gas industry.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer. Thus, the porous layer forms a reservoir, that is, a volume in which hydrocarbons accumulate. A well is drilled through the earth until the hydrocarbon bearing formation is reached. Hydrocarbons then can flow from the porous formation into the well.

Hydrocarbons, however, are not always able to flow easily from a formation to a well. Some subsurface formations, such as sandstone, are very porous. Hydrocarbons can flow easily from the formation into a well. Other formations, however, such as shale rock, limestone, and coal beds, are only minimally porous. The formation may contain large quantities of hydrocarbons, but production through a conventional well may not be commercially practical because hydrocarbons flow though the formation and collect in the well at very low rates. The industry, therefore, relies on various techniques for improving the well and stimulating production from formations. In particular, various techniques are available for increasing production from formations which are relatively nonporous.

Perhaps the most important stimulation technique is the combination of horizontal wellbores and hydraulic fracturing. A well will be drilled vertically until it approaches a formation. It then will be diverted, and drilled in a more or less horizontal direction, so that the borehole extends along the formation instead of passing through it. More of the formation is exposed to the borehole, and the average distance hydrocarbons must flow to reach the well is decreased. Fractures then are created in the formation which will allow hydrocarbons to flow more easily from the formation.

Fracturing a formation is accomplished by pumping fluid, most commonly water, into the well at high pressure and flow rates. Proppants, such as grains of sand, ceramic or other particulates, usually are added to the fluid along with gelling agents to create a slurry. The slurry is forced into the formation at rates faster than can be accepted by the existing pores, fractures, faults, vugs, caverns, or other spaces within the formation. Pressure builds rapidly to the point where the formation fails and begins to fracture. Continued pumping of fluid into the formation will tend to cause the initial fractures to widen and extend further away from the wellbore, creating flow paths to the well. The proppant serves to prevent fractures from closing when pumping is stopped.

Figure 1:
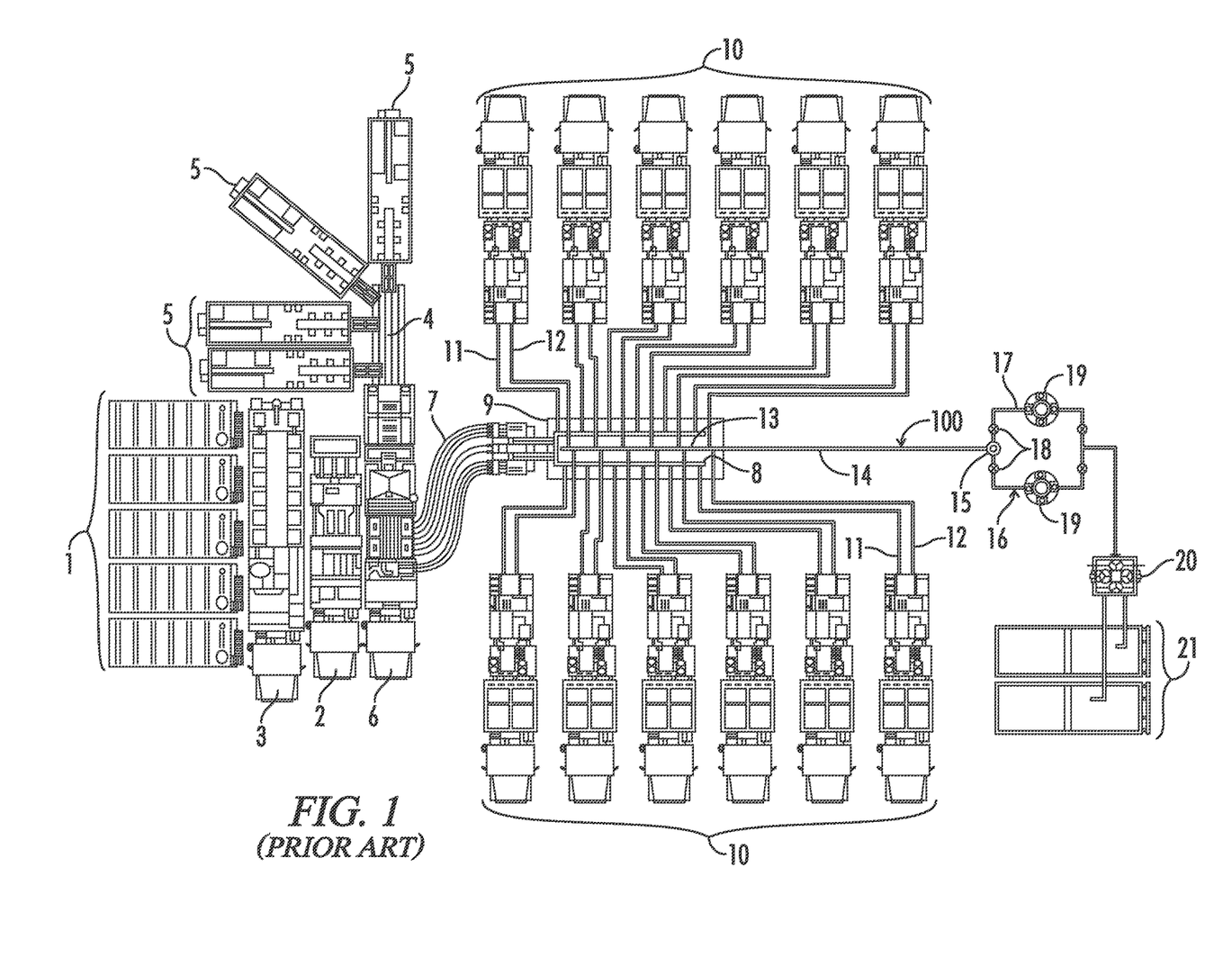
FIG. 1 (prior art) is a schematic view of a system for fracturing a well and receiving flowback from the well, which system includes a conventional frac trailer 9.

Systems for successfully completing a fracturing operation are extensive and complex, as may be appreciated from FIG. 1. FIG. 1 illustrates schematically a conventional frac system. Water from tanks 1 and gelling agents dispensed by a chemical unit 2 are mixed in a hydration unit 3. The discharge from hydration unit 3, along with sand carried on conveyors 4 from sand tanks 5 is fed into a blending unit 6. Blender 6 mixes the gelled water and sand into a slurry. The slurry is discharged through low-pressure hoses 7 which convey it into two or more low-pressure lines 8 in a frac manifold 9. The low-pressure lines 8 in frac manifold 9 feed the slurry to an array of pumps 10, perhaps as many as a dozen or more, through low-pressure "suction" hoses 11.

Pumps 10 take the slurry and discharge it at high pressure through individual high-pressure "discharge" lines 12 into a "missile" 13 on frac manifold 9. The combined flow from pump discharge lines 12 flows through missile 13 into a high-pressure line 14 running to a junction head 15 of a "zipper" manifold 16 (also referred to by some as a "frac manifold"). Zipper manifold 16 includes flow lines 17 running to, for example, two well heads 19 that control flow into and out of the well. Valves 18 are provided in zipper flow lines 17 so that the frac slurry may be selectively diverted to one of the well heads 19. Once fracturing is complete, flow back from the fracturing operation discharges into a flowback manifold 20 which leads into flowback tanks 21. Valves 18 then will be operated to divert frac fluid into the other well head 19 to frac that well.

Though not entirely apparent from the schematic representation of FIG. 1, it will be appreciated that conventional frac systems are assembled from a very large number of individual components. Assembly of so many components on site can be time consuming, expensive, and hazardous. Thus, some components of a frac system are assembled off site on trailers or skids and transported as a unit to the well site.

Commonly trailered or skidded units include not only process units, such as blender 6 and pumps 10, but also flow units. Frac manifold 9, for example, is an assembly of pipes, junctions, valves, and other flowline components that typically are assembled off-site. Collectively, they provide the flow unit that manifolds, distributes, and controls discharge from pumps 10. By skidding them, or mounting them on a trailer, assembly time at the well site is greatly reduced. Moreover, the components typically may be assembled more efficiently and reliably, and may be tested more easily in an off-site facility.

In part because of their complexity and multiplicity of parts, efforts have been made to simplify frac systems. Traditionally, frac manifolds have incorporated two or more smaller diameter missiles. At least one missile is mounted on each side of the frac manifold. Each missile is connected to pumps deployed on its side of the manifold. The flow from the missiles then would be manifolded and discharged into multiple high-pressure flow lines running to a zipper manifold or a well head. More recently, frac manifolds are being designed with a single, larger diameter missile that receives the discharge from pumps on both sides of the frac manifold and discharges that flow into a single flow line running towards the well.

Single-missile frac manifolds can offer important benefits. For example, a single, larger diameter missile usually will be assembled from fewer components and, therefore, single-missile frac manifolds have fewer potential leak points than manifolds with multiple, smaller diameter missiles. At the same time, however, the components of larger diameter missiles are larger and heavier. They are more difficult to handle during assembly and servicing of the frac manifold, and when the frac manifold is installed at a well site. Thus, single-missile frac manifolds often include a system that will facilitate handling of missile components.

For example, U.S. Pat. No. 9,995,201 to M. Dille et al. discloses a single-missile frac manifold trailer. The missile is assembled from flow connectors, each having two inlets for receiving discharge from a pair of pumps. The ends of the connectors are joined by flange unions to make up the missile. Each individual connector is secured on a mounting structure that in turn is connected to a pair of slide assemblies. The slide assemblies include rollers that allow the individual flow assemblies to roll along a pair of rails mounted on the trailer frame. The rail system thus makes it easier to shift the individual connectors laterally relative to each other to make up or break down the flange unions joining the connectors. Nevertheless, the rail system is needlessly complicated and costly to manufacture and assemble.

The statements in this section are intended to provide background information related to the invention disclosed herein. Such information may or may not constitute prior art. It will be appreciated from the foregoing, however, that there remains a need for new and improved frac manifolds. Such disadvantages and others inherent in the prior art are addressed by various aspects and embodiments of the subject invention.

SUMMARY OF THE INVENTION

The subject invention, in its various aspects and embodiments, relates generally to chassis-mounted frac manifolds and encompasses various embodiments and aspects, some of which are specifically described and illustrated herein. One broad embodiment provides for a frac manifold mounted on a chassis. The chassis-mounted frac manifold comprises a frame, a missile, and a mounting system. The missile comprises a plurality of flowline components releasably secured to the frame and joined by unions along a common axis. The unions allow the components to be made up and broken down. The mounting system comprises a plurality of roller bearing assemblies connected to the frame. The missile is supported on the roller bearing assemblies for movement along the common axis. Thus, a first missile component may be shifted relative to a second missile component along the common axis by securing the first missile component to the frame and releasing the second missile component from the frame. The second missile component then can be shifted across one or more of the roller bearing assemblies.

Other embodiments provide such chassis-mounted frac manifolds where each of the missile components is supported on at least one roller bearing assembly or preferably on two roller bearing assemblies.

Yet other embodiments provide such chassis-mounted frac manifolds that comprise a single missile or where the frame comprises two lateral beams joined by cross members and the single missile is supported along the center line of the frame.

Still other embodiments provide such chassis-mounted frac manifolds where the roller bearing assembly comprises a single cylindrical bearing rotatably mounted on a shaft. Additional embodiments provide such chassis-mounted frac manifolds where the roller bearing assembly comprises multiple cylindrical bearings or ball bearings mounted in a bearing race.

Further embodiments provide such chassis-mounted frac manifolds where the missile and one or more of its flowline components are releasably secured to the roller bearing assemblies by a clamp, such as a C-clamp. The clamp may be removably attached to the roller bearing assembly or to the frame of the chassis.

Yet other embodiments provide such chassis-mounted frac manifolds where the flowline components are supported on mounting plates, where the mounting plates are releasably connected, directly or indirectly, to the chassis frame, where the flowline components are connected, preferably releasably connected to the mounting plates, or where the mounting plate is releasably connected to the chassis frame by anti-vibration mounts.

In other aspects and embodiments, the subject invention provided anti-vibration mounts that may be used in chassis-mounted frac manifolds and other chassis-mounted flowline assemblies. One broad embodiment of the novel anti-vibration mounts comprises a base, a shaft, a connector, lead, a bushing, and a resilient body. The base has a cavity extending from a top surface of the base toward the bottom of the base. The shaft has threaded upper and lower ends and extends through the cavity. The shaft is coupled at its lower end to the base by a threaded engagement. The connector has a head and a threaded end and is coupled at its threaded end to the shaft by a threaded engagement. The connector is adapted to couple a part that is subject to vibration while the flowline is in operation. The base cavity and the shaft are dimensioned to define a receptacle. The receptacle extends around the shaft between the shaft and the walls of the base cavity and has a lower portion and an upper portion. The lower portion is substantially filled with lead. The bushing is received in the upper portion of the receptacle around the shaft and above the lead. The bushing has a lower surface bearing on the lead and an upper bearing surface. The upper bearing surface is elevated above the top surface of the base and adapted to bear the load of the part. The resilient body is carried around the connecter. When the part is coupled to the mount, the resilient body is between the part and the connector head.

Other embodiments provide such anti-vibration mounts where the resilient body is one or more Belleville washers.

Still other embodiments provide such anti-vibration mounts where the lead was provided by pouring molten lead into the receptacle lower portion or is a pre-formed lead bushing. The lead itself may be commercially pure lead or lead alloys and many are commercially available.

Yet other embodiments provide such anti-vibration mounts where the threaded engagement between the base and the shaft is spot welded.

In other aspects and embodiments, the subject invention provides for chassis-mounted assemblies of flowline components. The assemblies comprise a frame and a plurality of flowline components joined by unions. At least one the component, but preferably all the components, are coupled to the frame by novel anti-vibration mounts.

Additional embodiments provide such chassis-mounted flowline assemblies where the coupled component is mounted on a mounting plate and the mounting plate is coupled to the frame through the anti-vibration mount.

Finally, still other aspects and embodiments of the invention provide apparatus and methods having various combinations of such features as will be apparent to workers in the art.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the manner in which it may be practiced. The subject invention encompasses other embodiments consistent with the disclosure provided herein.

In the drawings and description that follows, like parts are identified by the same reference numerals. The drawing figures also are not necessarily to scale. Certain features of the embodiments may be shown exaggerated in scale or in somewhat schematic form and some details of conventional design and construction may not be shown in the interest of clarity and conciseness. For example, certain components of the embodiments shown in the figures have been omitted to better illustrate the remaining components.

DESCRIPTION OF ILLUSTRATIVE EMBODIMENTS

The invention, in various aspects and embodiments, is directed generally to frac trailers and other chassis-mounted frac manifolds as are used to convey abrasive, corrosive fluids under high pressure. Various specific embodiments will be described below. For the sake of conciseness, however, all features of an actual implementation may not be described or illustrated. In developing any actual implementation, as in any engineering or design project, numerous implementation-specific decisions must be made to achieve a developer's specific goals. Decisions usually will be made consistent within system-related and business-related constraints. Specific goals may vary from one implementation to another. Development efforts might be complex and time consuming and may involve many aspects of design, fabrication, and manufacture. Nevertheless, it should be appreciated that such development projects would be routine effort for those of ordinary skill having the benefit of this disclosure.

The novel frac manifolds will be used to manifold the discharge from a plurality of pumps in frac systems, such as those shown in FIG. 1. For example, a first preferred embodiment 100 of the novel chassis-mounted frac manifolds may be used in the illustrated frac system instead of frac manifold 9. The high-pressure discharge from pumps 10 is manifolded in a single missile 30 of frac manifold 100, fed into a single flow line 14, and thence into zipper manifold 16.

Frac manifold 100 and the novel frac systems are similar in other respects to frac manifold 9 and the frac systems of FIG. 1. Frac manifold 100 has a suction system that may comprise a suction manifold. The suction manifold may be a transverse pipe mounted near the rear of the chassis. It may be provided with a number of connections, such as hammer unions, allowing it to receive and manifold the discharge from blender 6 via blender hoses 7. The suction manifold may be connected to a pair of suction lines, such as suction lines 8, that may run laterally along each side of frac manifold 100. The suction lines feed slurry into pumps 10 via hoses, such as suction hoses 11.

A sub-assembly 101 of frac manifold 100 is shown in FIGS. 2-7. As best appreciated from FIG. 2, sub-assembly 101 and frac manifold 100 comprise missile 30, feed arms 40, a chassis 50, and a mounting system 60. Missile 30 comprises a plurality of cross-junctions, in this embodiment eight cross-junctions 31 (four cross-junctions 31 have been omitted from FIG. 2 to better show other components of frac manifold 100). Cross-junctions 31, as discussed further below, are connected to pumps 10 via pump discharge lines, such as lines 12, and feed arms 40. More specifically, each cross-junction 31 is connected to two pumps 10 positioned on opposite sides of frac manifold 100. While missile 30 comprises eight cross-junctions 31, it may be assembled from any number of cross junctions 31 to accommodate more or fewer pumps. Typically, missile 30 might be provided with from four to ten cross-junctions 31.

Cross junctions 31 have a somewhat elongated, generally cylindrical main body portion that provides a primary conduit through which slurry passes as it is manifolded and conveyed towards well head 19. Each end of the main body portion terminates in a flange allowing cross junctions 31 to be joined to each other along a common axis by flange unions. A pair of body extensions extend symmetrically from opposite sides of the main body portion. The extensions provide conduits for feeding discharge from an individual pump 10 into the primary conduit. Each body extension terminates in a union face that allows cross junction 31 to be connected to feed arms 40 by a flange union.

It will be appreciated, however, that missile 30 may be assembled from other cross-junctions. Many suitable cross-junctions are known to workers in the art and may be used to advantage in the novel frac manifolds. Likewise, the components may be joined by other conventional connections, such as hammer unions, clamp unions, or threaded connections.

Feed arms 40 swing away from missile 113 and make it easier to connect pump discharge hoses 12. Feed arms 40 comprise a flanged, female sub of a hammer union which is joined to the body extensions of cross-junctions 31 at their union face by a flange union. A flow control valve, such as plug valve 41 or another conventional shut-off valve, is connected to the hammer union sub by a hammer union. A swivel joint 42 is connected to plug valve 41 via a hammer union. Swivel joint 42 comprises a number of elbow pipes joined by swivel connections that allow swivel joint 42 to rotate along two axes of rotation. It terminates in a female hammer union sub that allows feed arms 40 to be connected to pump discharge hoses 12 by a hammer union.

The hammer unions used in missile 30 preferably are of the type disclosed in applicant's U.S. patent application Ser. No. 15/377,509, filed Dec. 13, 2016, the disclosure of which is incorporated herein by reference. Other designs are known in the art, however, and may be used. Similarly, the feed arms may comprise other conventional types of unions. In general, feed arms 40 may have various conventional designs.

Missile 30 and connection arms 40 are mounted on chassis 50. Chassis 50 allows the novel frac manifolds to be assembled and maintained more reliably and to be transported to a well site more easily. As best appreciated from FIG. 2, chassis 50 comprises a frame 51 having pair of lateral beams, such as I-beams 52 tied together by cross-members 53. Structural steel having other configurations, such as C-beams, may be used as well. Similarly, cross-members may have any suitable design and will be assembled to I-beams 52 by welds, threaded connectors, or other typical means. Frame 51 provides the primary structural framework for frac manifold 100. It is the frame on which the suction system, missile 30, connection arms 40, and the other components of frac manifold 100 are mounted, either directly or indirectly.

Chassis 50 preferably is a rolling chassis, such as a trailer. Thus, it preferably includes a suspension system, a wheel assembly, and a hitch assembly. It also preferably is provided with a mechanism for lifting the forward end of the trailer, such as hydraulic or mechanical jacks. Jacks will enable the trailer to be more easily hitched to and unhitched from a tractor as required. Jacks or other mechanisms also may be provided to level the trailer on site. Running and signal lights may be provided as desired or required by regulation. Hydraulic systems, such as for hydraulic jacks, may be actuated and controlled by conventional systems. Such systems typically will include hydraulic pumps, accumulators, lines, and valves, and digital controllers and operation panels. Given that such features are well known to workers in the art, they have been omitted from the figures for the sake of clarity.

Chassis 50 also may be a truck, or it may be a skid or other non-rolling chassis. When mounted on a skid or other non-rolling chassis, the novel frac manifolds will be transported to a site on a lowboy, flatbed, or other trailer. They may be loaded on and off the trailer by conventional lifting equipment. Many chassis designs are known to worker in the art and may be selected and modified as necessary for use in the novel frac manifolds.

Missile 30 preferably is mounted along the center of frame 51 on suitable mounts, for example, on mounting system 60. Mounting system 60 in turn is mounted to frame 51. When frac manifold 100 is in operation, mounting system 60 holds missile 30 securely in place, preventing it from shifting laterally or vertically on the chassis or rotating along its axis. Flowline components, such as cross-junctions 30, are quite heavy and difficult to manipulate. Thus, mounting system 60 incorporates systems to assist in making up and breaking down the components. For example, mounting system 60 may be operated to help make up and break down the flange unions joining cross junctions 31 in missile 30.

As seen best in FIGS. 2-5, mounting system 60 generally comprises mounting plates 61 and roller mounts 62. A plate 61 is provided for each cross-junction 31 in missile 30. Roller mounts 62 are mounted in a linear array along the length of frame 51. Each cross junction 31 is supported by a pair of roller mounts 62. Roller mounts 62 allow missile 30 or any individual cross junction 31 to move laterally along their axis.

Plates 61 are generally square shaped, with cutouts at their forward end to accommodate roller mounts 62. Plates 61 provide support for cross-junctions 31 and plug valves 41. Cross-junctions 31 and plug valves 41 are secured to plates 61 by clamps, straps, threaded connectors, or other releasable connections, but can be attached thereto by welds or any other conventional means (not shown). Plates 61 preferably are releasably connected to frame 51 by nuts and bolts, or other threaded connectors extending through blocks (not shown) and into I-beams 51, cross-members 53, or other components of frame 51.

Plates 61 also may be mounted directly on frame 51 by threaded connectors. Securing plates 61 to frame 51 will restrict missile 30 from shifting laterally or vertically or rotating about its axis during service. It will be appreciated that it may not be necessary to secure the mounting plate 61 for every cross-junction 31 to frame 51 in order to restrict shifting or rotation of missile 30. It may be sufficient to connect only one or two mounting plates 61. Plates 61 also may be attached to frame 51 by anti-vibration mounts, such as antivibration mounts 70 shown in FIGS. 15-16. Alternately, cross junctions 31 and plug valves may be secured to plates 61 by anti-vibration mounts 70.

For example, a preferred embodiment 160 of the novel mounting system is shown in FIGS. 8-14. As appreciated therefrom, mounting system 160 is similar to mounting system 60 in that it comprises mounting plates 61 and roller mounts 62. Mounting plates 61, however, are secured to a chassis 150 by antivibration mounts 70.

Figure 16:
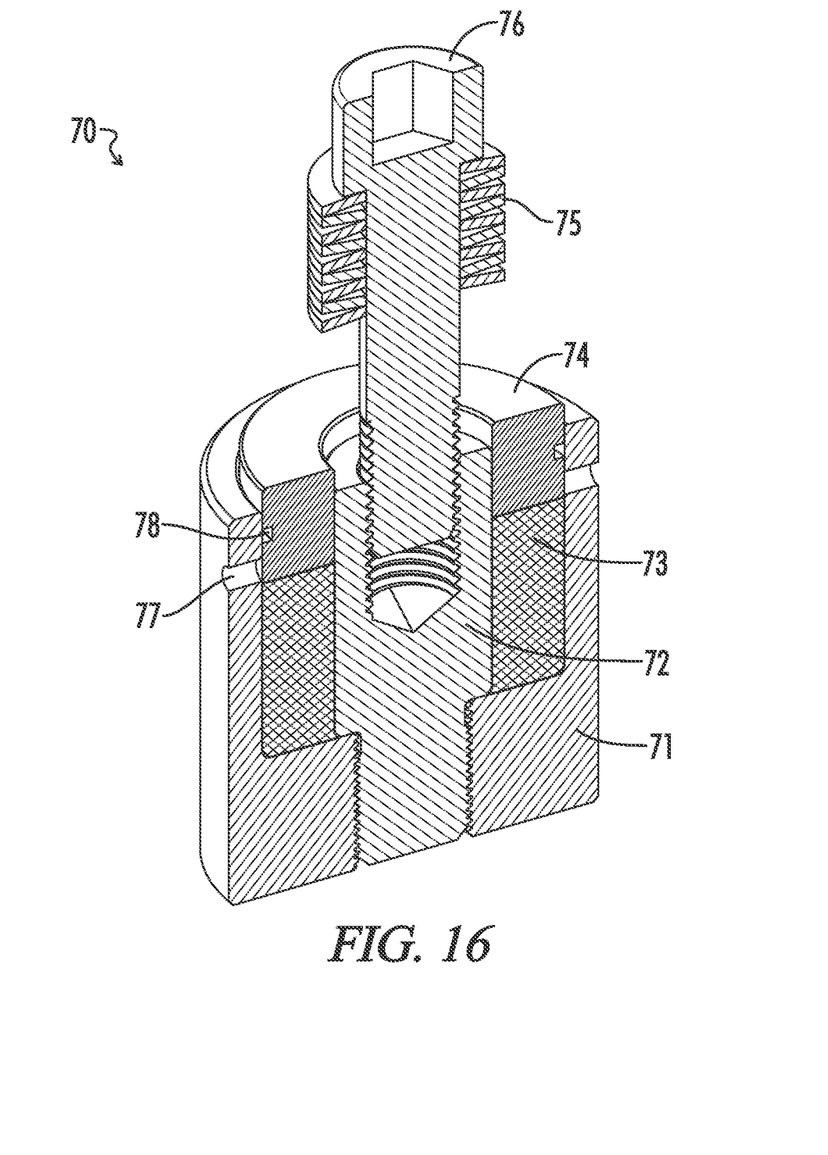
FIG. 16 is an isometric, cross-sectional view of novel anti-vibration mount 70.

As shown in FIGS. 15-16, antivibration mounts 70 generally comprise a mount body or base 71, a shaft or core 72, lead fill 73, an annular bushing 74, a resilient body 75, and a connector 76. Mount base 71 is a cup shaped body. It has a generally cylindrical cavity extending from its top surface toward its bottom. The main portion of core 72 has a cylindrical shape. Core 72 is disposed concentrically within the interior cavity of mount base 71 and rests on the bottom of the cavity. Core 72 is connected to the bottom of mount base 71, e.g., by the engagement of a threaded extension projecting downward from its lower surface with a threaded hole in the bottom of mount base 71. The threaded engagement may be secured and prevented from loosening by spot welding if desired.

Core 72 thus defines an annular receptacle within mount base 71 that extends between the outer circumference of core 72 and the inner circumference of mount base 71. The lower portion of the annular receptacle is filled with lead, for example, by pouring molten lead into the annular receptacle until is overflows through holes 77 in mount base 71. A pre-formed lead bushing also may be carried in the annular receptacle. Bushing 74 is carried in the upper portion of the annular receptacle around core 72 and on top of lead fill 73. Preferably, as shown, an O-ring 78 is provided to fit and minimize the ingress of moisture and debris into the gap between bushing 74 and the receptacle in base 71.

Plate 61, for example, may be mounted to mount 70 by a connector, such as threaded connector 76. Connector 76 is a bolt having a head and a threaded end. Connector 76 is passed through an aperture in plate 61 and thence into a threaded hole in the upper surface of core 72. Resilient body 75, such as a plurality of Belleville washers, is carried on connector 76 between the head of connector 76 and the upper surface of plate 61. It will be noted that the upper surface of bushing 74 extends above the upper edge of mount base 71. Thus, when plate 61 or other loads are placed on mount 70, it will bear on bushing 71 which in turn bears on lead fill 73. Lead fill 73 and resilient body 75 thus are able to absorb vibrational energy transmitted through plate 61.

Roller mounts 62 incorporate a roller bearing assembly. For example, as seen best in FIGS. 6-7, roller mounts 62 comprises a bearing housing 63, a roller bearing 64, and a shaft 65. Shaft 65 extends through a cylindrical passage in roller bearing 64 and is mounted in housing 63. Roller bearing 64 thus is able rotate on shaft 65. Housing 63 preferably is provided with grease ports, such as port 66, to lubricate roller bearing 64. Roller bearing 64 is generally cylindrical, and somewhat elongated, but its mid-section preferably is shaped to assist in maintaining proper alignment of missile 30 and cross junctions 31 along their axis. It will be appreciated, however, that roller mounts 62 may incorporate two or more cylindrical bearings similar to bearings 64. Housing 63 also may be provided with a race for ball bearings.

Roller mounts 62 are mounted to cross-members 53 of frame 51 by threaded connectors extending through housing 63, but they may be mounted by welds or other conventional connections. Likewise, roller mounts 62 may be mounted to I-beams 52 or to other components of frame 51.

Figure 2:
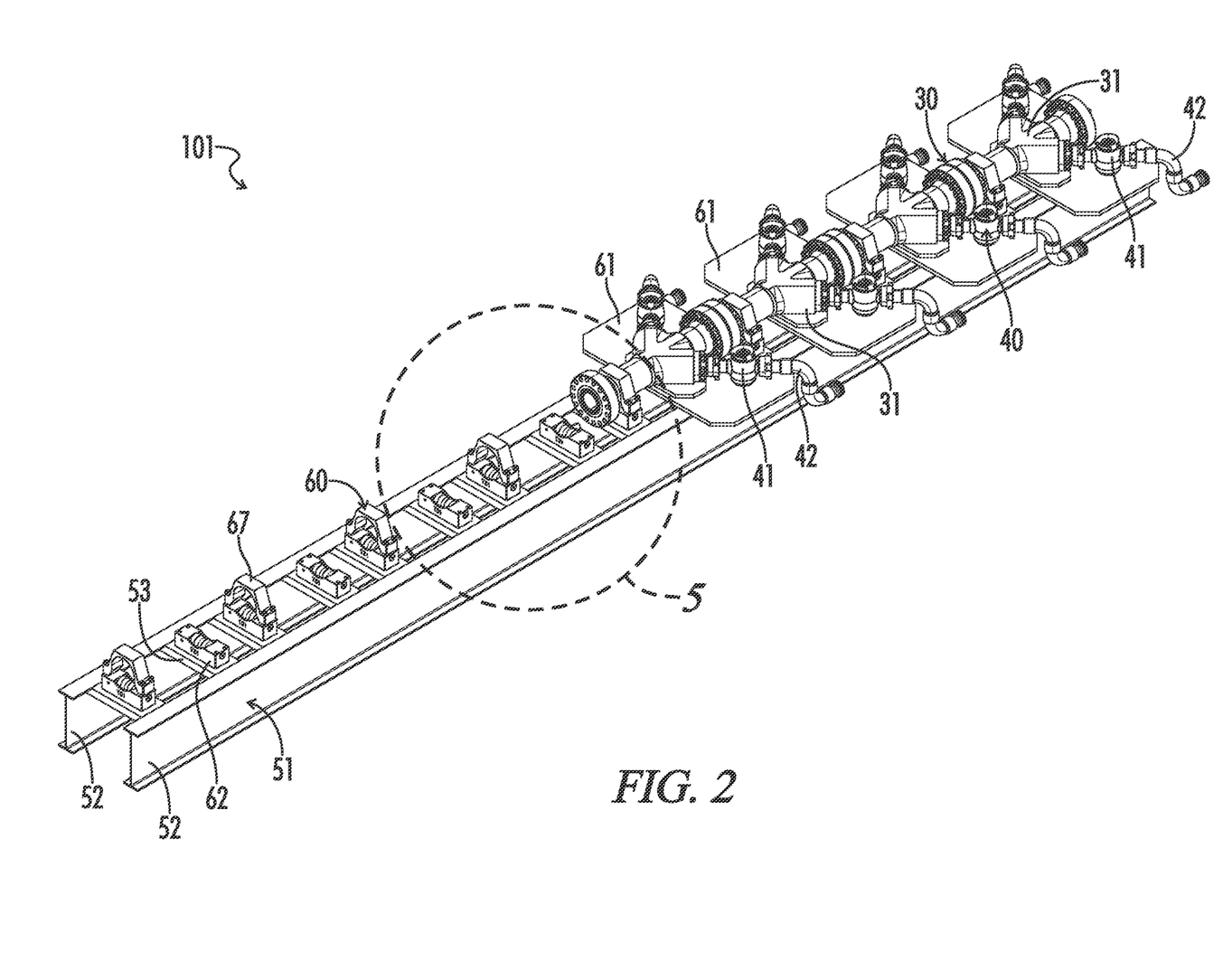
FIG. 2 is an isometric view, taken generally from above and to one side, of a subassembly 101 of a first preferred embodiment 100 of the chassis-mounted frac manifolds of the subject invention, which subassembly 101 comprises a first preferred embodiment 60 of the novel missile mounting systems of the subject invention.
Figure 3:
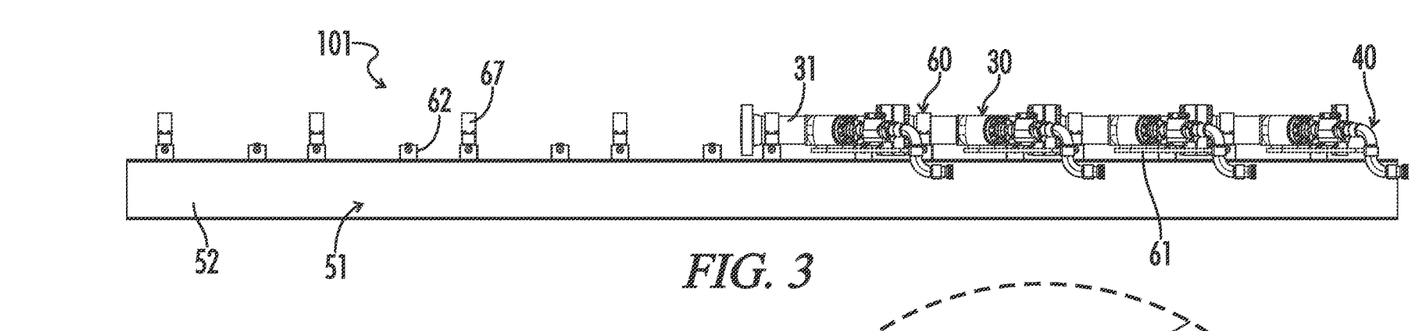
FIG. 3 is a side view of subassembly 101 shown in FIG. 2.
Figure 4:
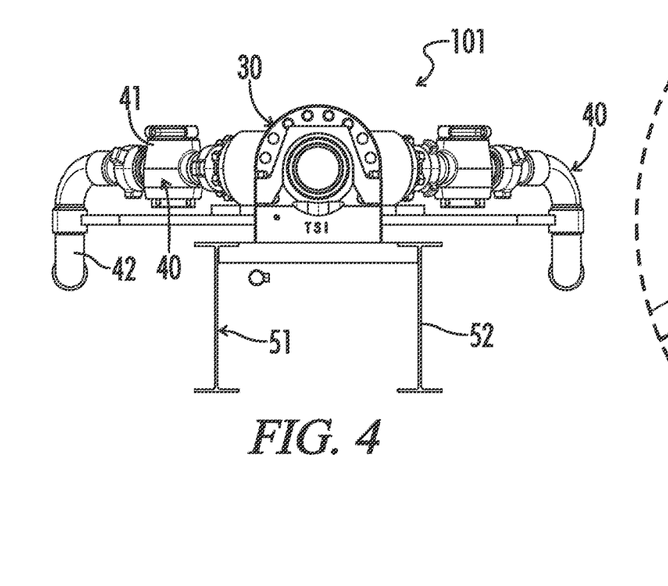
FIG. 4 is an end view of subassembly 101 shown in FIGS. 2-3.
Figure 5:
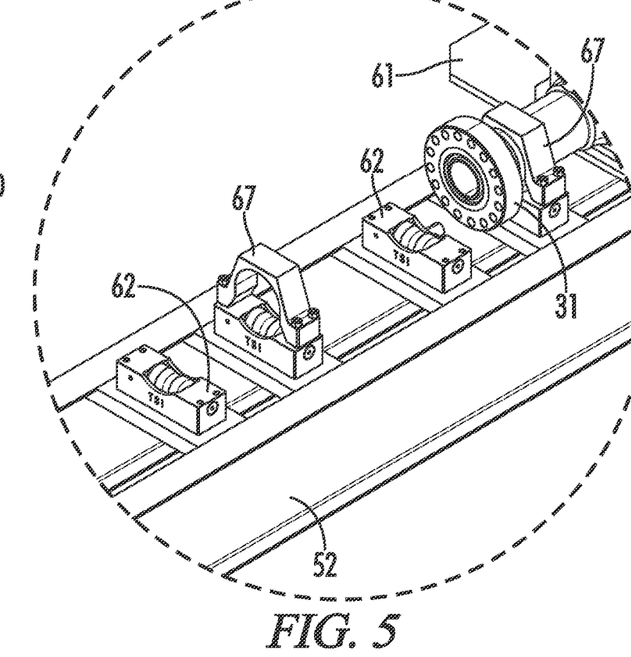
FIG. 5 is an enlarged view of area F5 of FIG. 2 showing in greater detail missile mounting system 60.
Figure 6:
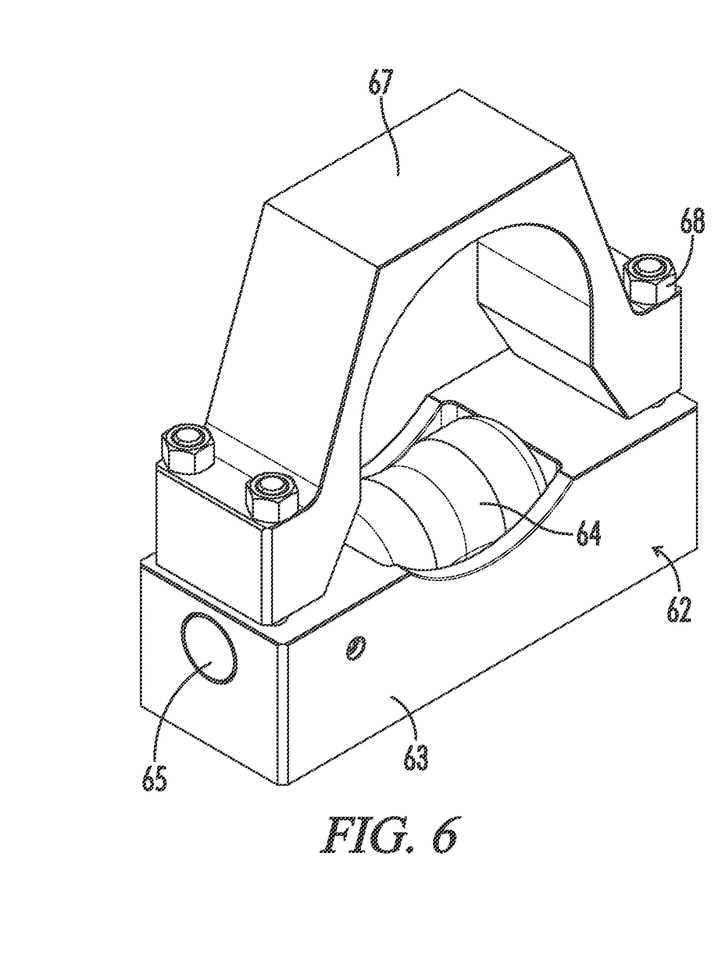
FIG. 6 is an isometric view, taken from above and to one side, of roller mount 62 and clamp 67 of mounting system 60.
Figure 7:
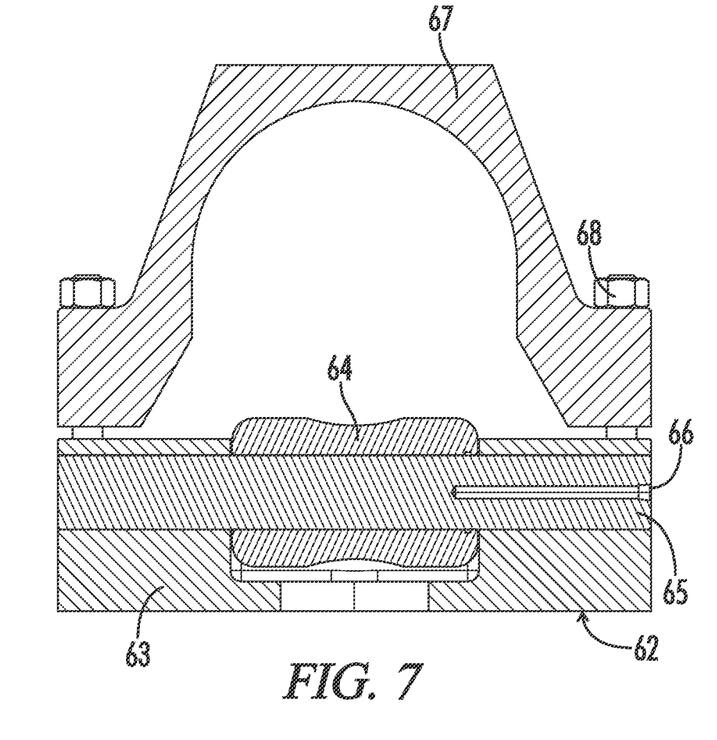
FIG. 7 is a lateral cross-sectional view of roller mount 62 and clamp 67 shown in FIG. 6.
Figure 8:
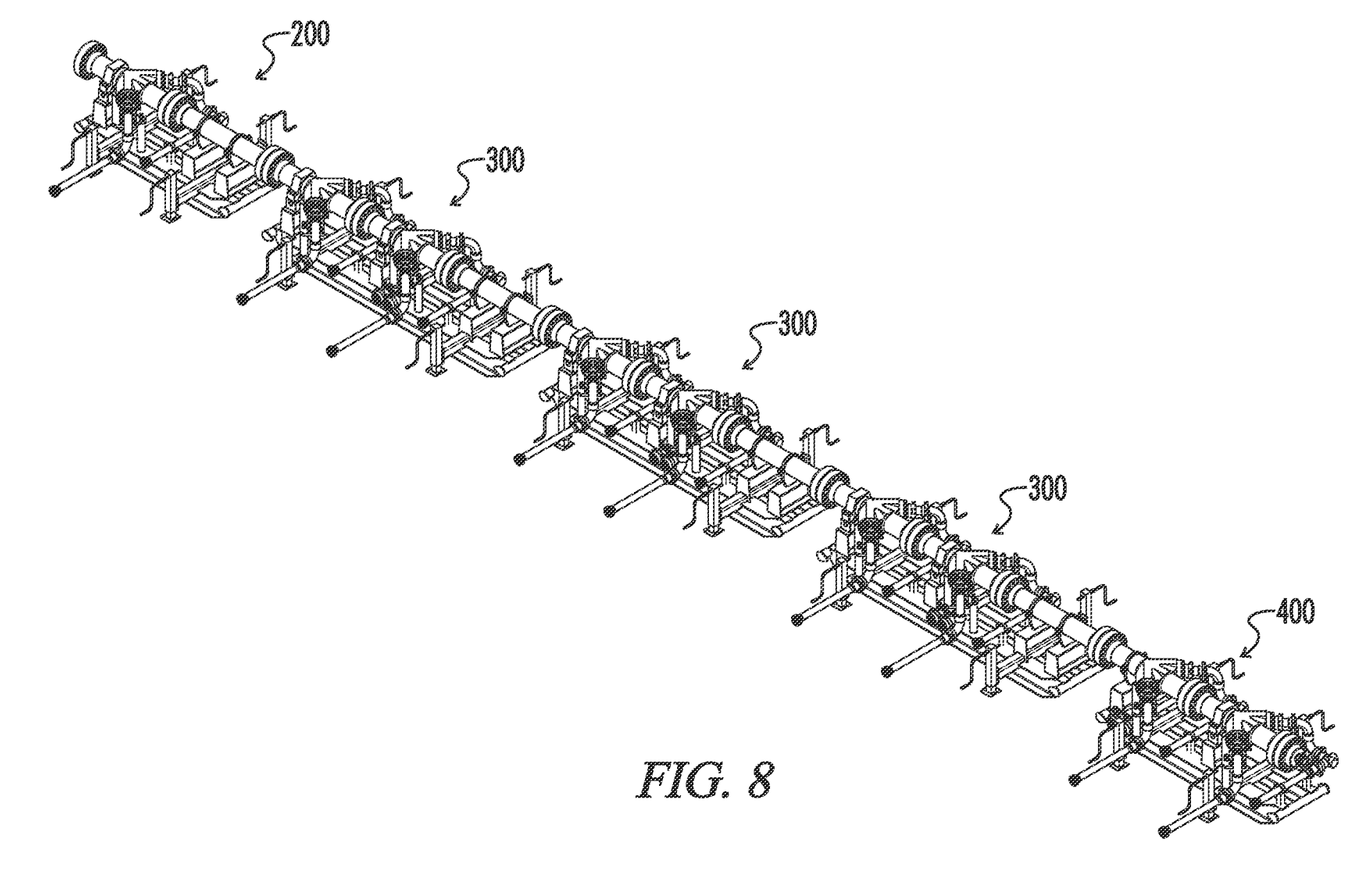
FIG. 8 is an isometric view of an assembly of second 200, third 300, and fourth 400 embodiments of the chassis-mounted frac manifolds of the subject invention, which chassis-mounted frac manifolds 200, 300, and 400 comprise a second novel missile mounting system 160 of the subject invention.
Figure 9:
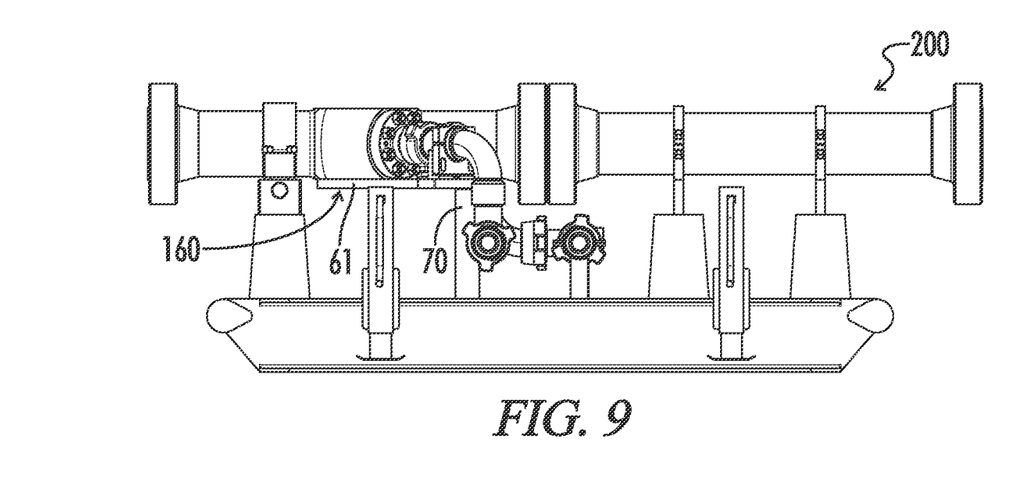
FIG. 9 is side elevational view of the second preferred chassis-mounted frac manifold 200 shown in FIG. 8, which chassis-mounted frac manifold 200 comprises mounting system 160 which incorporates a preferred embodiment 70 of the novel anti-vibration mounts.
Figure 10:
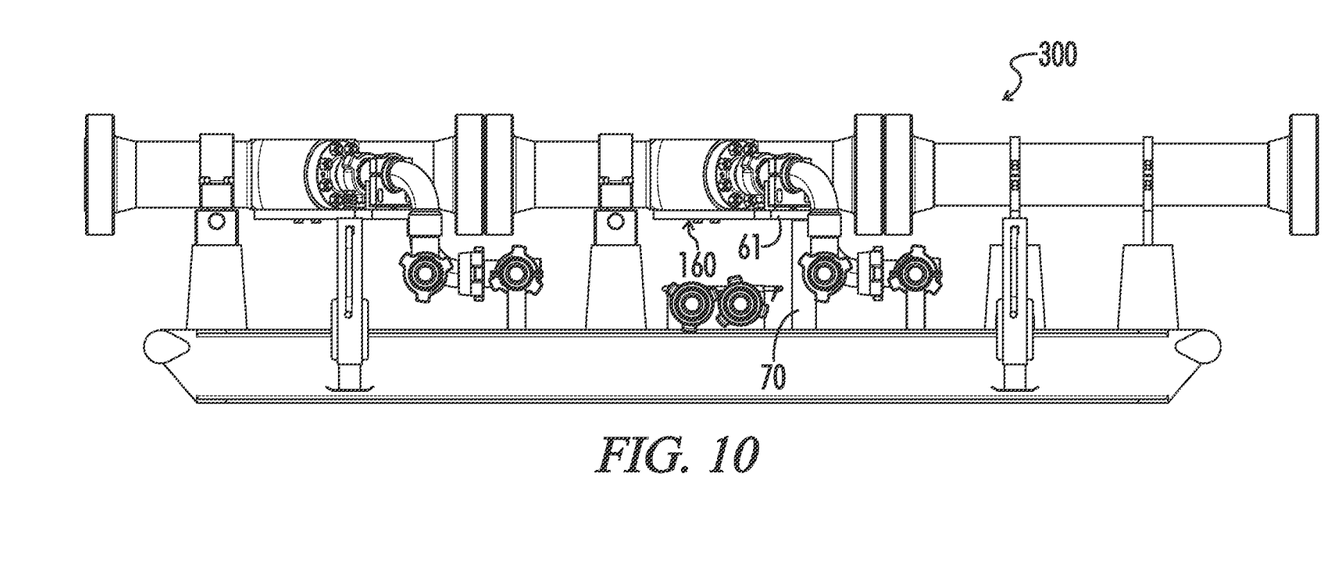
FIG. 10 is side elevational view of the third preferred chassis-mounted frac manifold 300 shown in FIG. 8, which chassis-mounted frac manifold 300 comprises mounting system 160 incorporating novel anti-vibration mounts 70.
Figure 11:
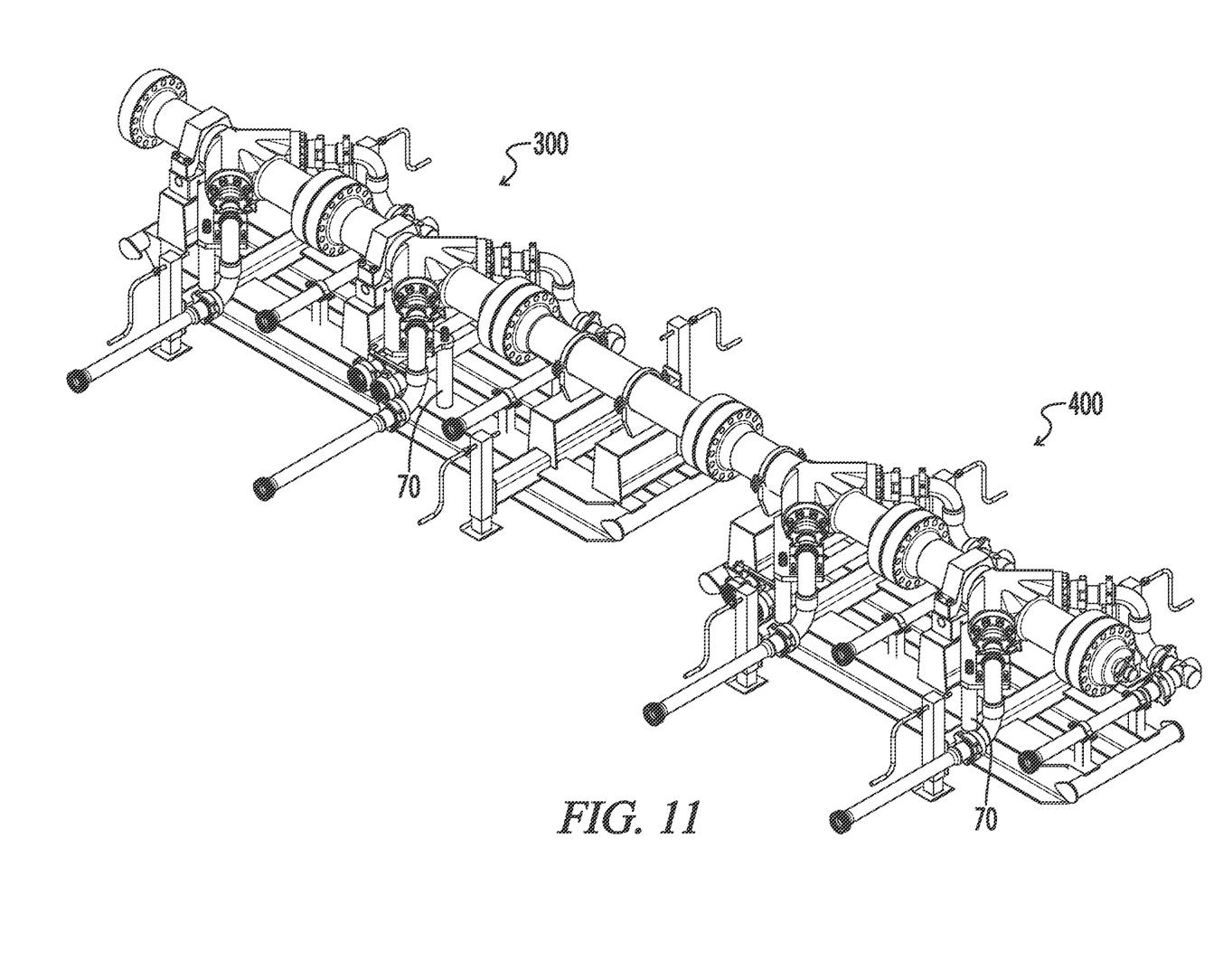
FIG. 11 is an isometric view of an assembly of chassis-mounted frac manifold 300 and chassis-mounted frac manifold 400.
Figure 12:
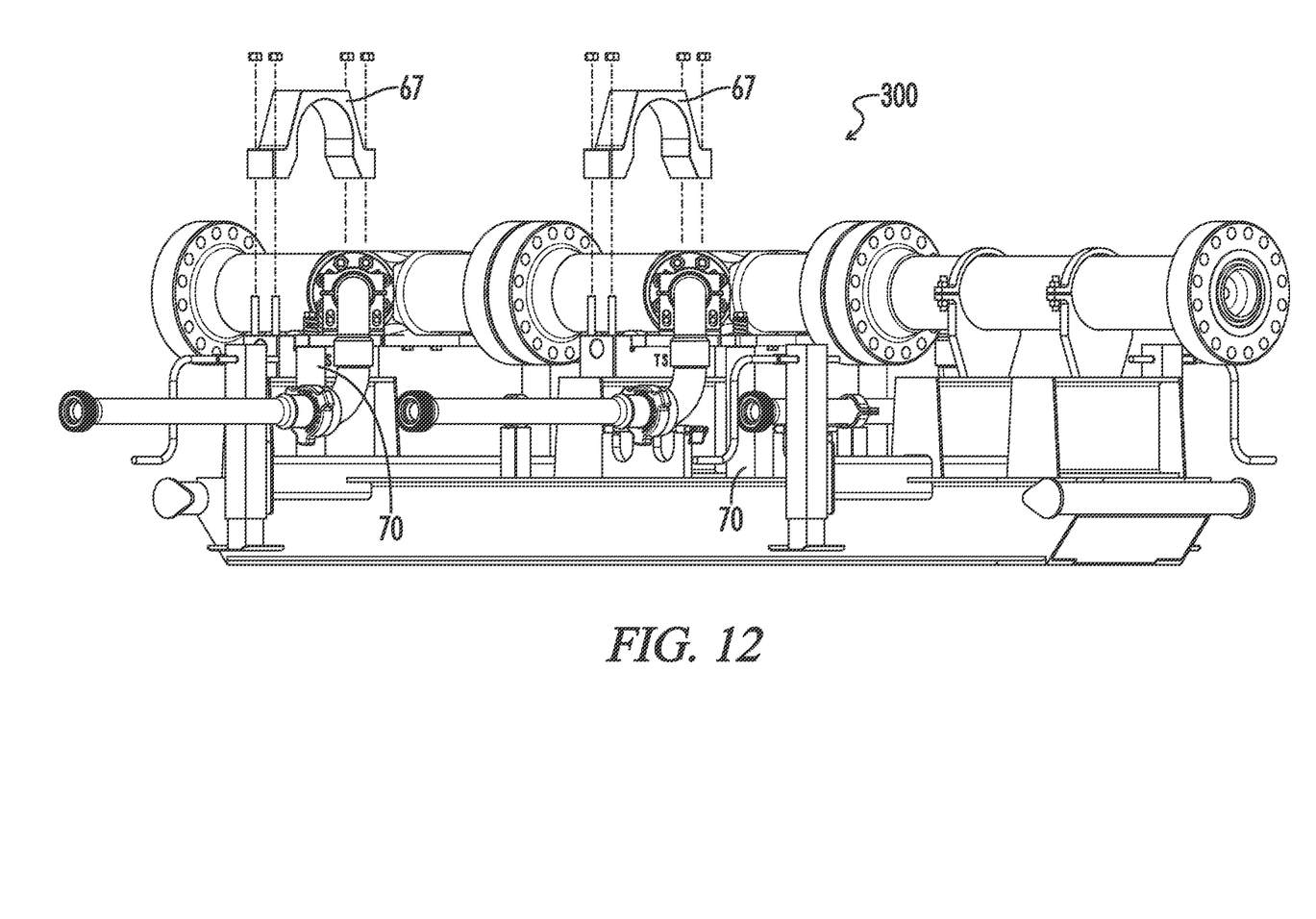
FIG. 12 is a partially exploded, partial isometric view of chassis-mounted frac manifold 300.
Figure 13:
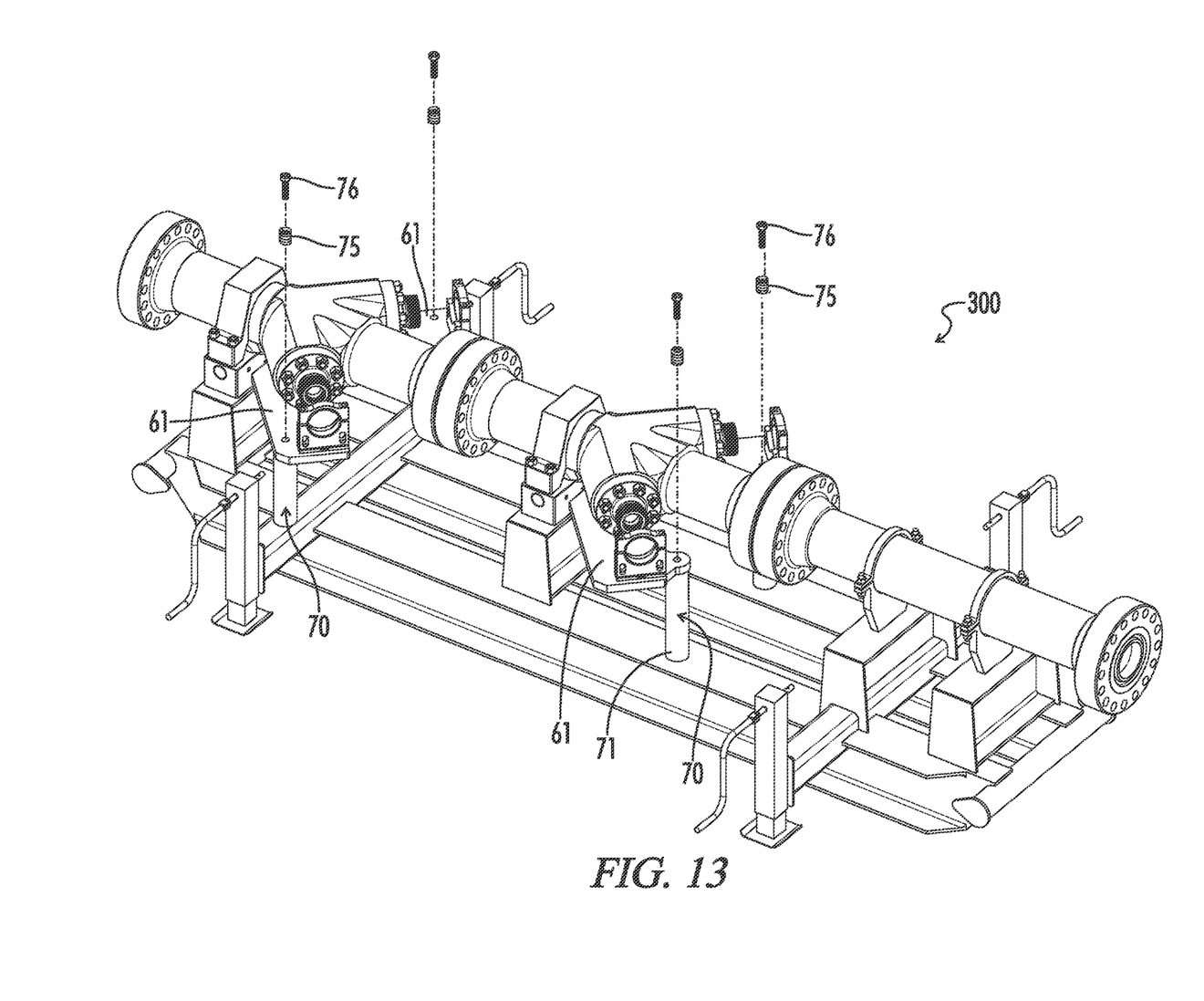
FIG. 13 is an isometric view showing uncoupling of mounting plates 61 from the frame 51 of chassis-mounted frac manifold 300.
Figure 14:
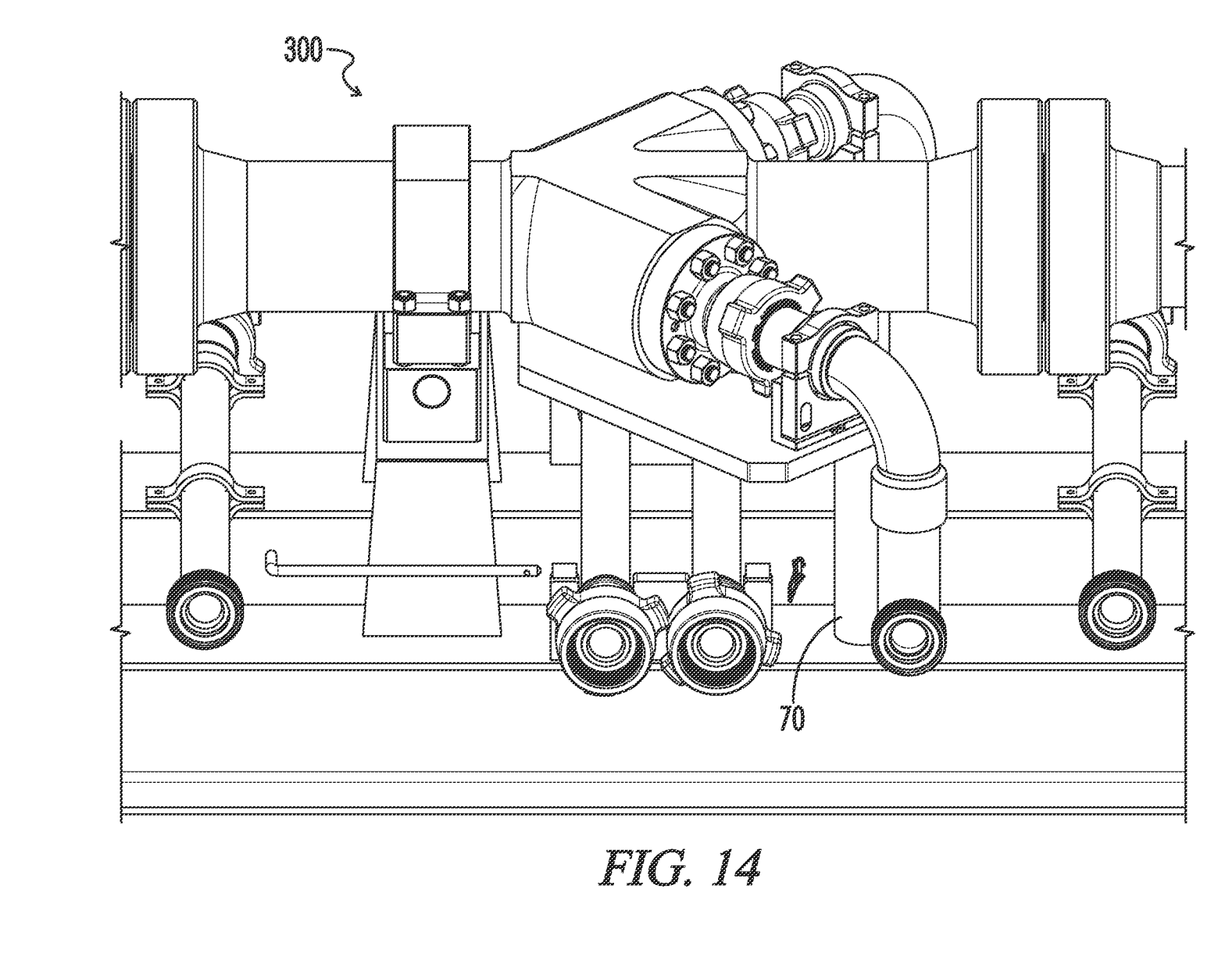
FIG. 14 is an enlarged, isometric view of a portion of chassis-mounted frac manifold 300 showing anti-vibration mount 70.
Figure 15A:
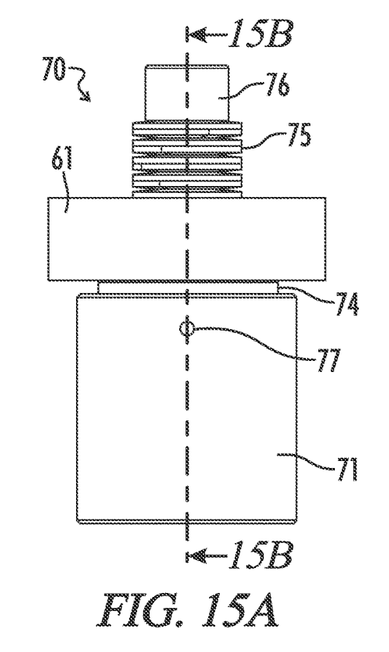
FIG. 15A is a side elevational view of novel anti-vibration mount 70 shown in FIGS. 9-14, the view showing a portion of mounting plate 61 coupled to the anti-vibration mount 70.
Figure 15B:
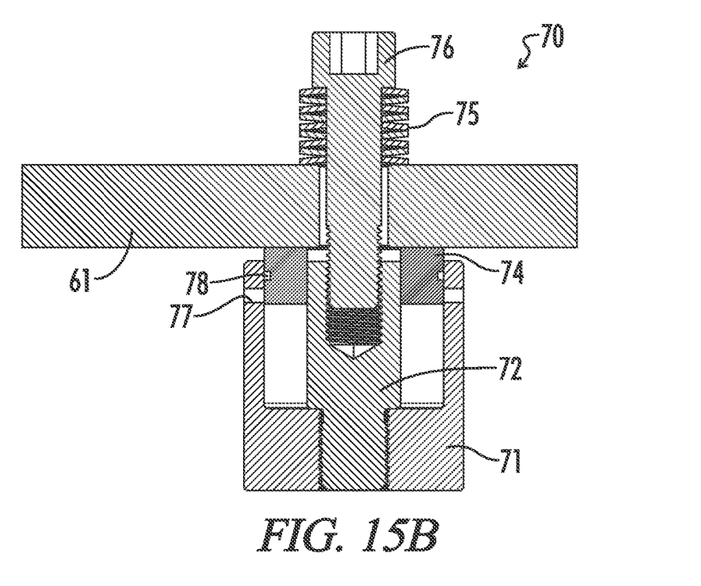
FIG. 15B is cross-sectional view of novel anti-vibration mount 70 also showing a portion of mounting plate 61.
Figure 15C:
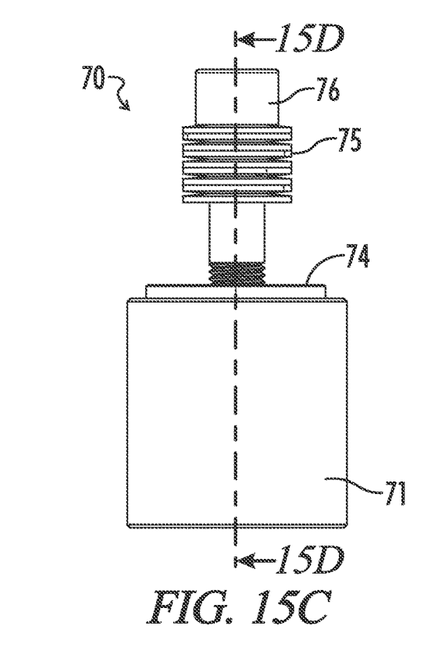
FIG. 15C is another side elevational view of novel anti-vibration mount 70.
Figure 15D:
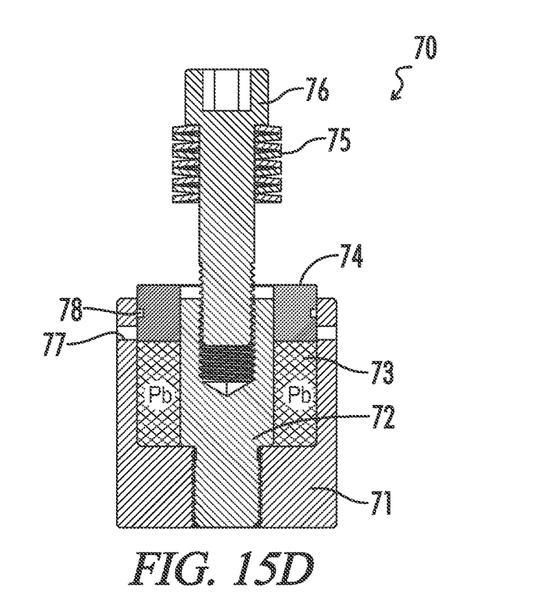
FIG. 15D is another cross-sectional view of novel anti-vibration mount 70.

Clamps 67 preferably are provided to secure missile 30 on roller mounts 62. As seen best in FIGS. 6-7, clamps 67 are generally C-shaped and are removably secured to the top of housing 63 of roller mounts 62 by threaded connectors, such as bolts 68. Bolts 68 also serve to connect roller mounts 62 to frame 51. As illustrated in FIGS. 2-3, it may not be necessary to mount clamps 67 on each roller mount 62. If desired, however, clamps 67 may be provided for each roller mount 62. Other style clamps also may be used. Similarly, if desired, clamps 67 may be laterally offset from roller mounts 62 and connected directly to frame 51.

By selectively coupling and uncoupling cross junctions 31 from frame 51, the unions between cross-junctions 31 may be more easily made up and broken down. For example, it may be necessary to disassemble missile 30 and remove a particular cross-junction 31. The cross junctions 31 extending, for example, rearwardly from one end of the particular cross-junction 31 may be uncoupled from frame 51 by loosening their respective clamps 37 and mounting plates 61. The particular cross-junction 31, and the cross junctions 31 extending forwardly from its other end, all will remain coupled to frame 51. The nuts securing the flange connection between the particular cross-junction 31 and the adjacent loosened cross junction 31 are removed. The loosened, rearward cross-junctions 31 then can be slid rearwardly across their respective roller mounts 62 to create a gap between them and the particular cross-junction 31. Nuts on the flange connection on the other, forward end of the particular cross-junction 31 then are removed, allowing the particular cross junction 31 to be slid rearwardly across its roller mounts 62 to a point where it can be lifted out of missile 30. The particular cross junction 31 may be replaced with a new or refurbished cross-junction 31 by essentially the same process in reverse.

Mounting system 60 also may be used to make up or break down a connection between missile 30 and, for example, flow line 14 leading to zipper manifold 16. All cross-junctions 31 would be loosened from frame 51. The entire missile 30 then can be slide laterally across roller mounts 62.

The frac manifolds of the subject invention may be manufactured by methods and from materials commonly used in manufacturing flow iron components. Given the extreme stress, the cyclic vibrations, the corrosive and abrasive fluids, and the high-pressure, high-velocity flow to which frac manifolds are exposed, suitable materials will be hard and strong. For example, the cross-junctions, except for their seals, may be manufactured from 4130 and 4140 chromoly steel or from somewhat harder, stronger steel such as 4130M7, high end nickel alloys, and stainless steel. They may be made may be made by any number of conventional techniques, but typically and in large part will be made by forging, extruding, or mold casting a blank part and then machining the required features into the part. The frame and components of the mounting system also will be made of suitable structural steel. Conventional components of the novel frac manifolds also are widely available from a number of manufacturers.

While this invention has been disclosed and discussed primarily in terms of specific embodiments thereof, it is not intended to be limited thereto. Other modifications and embodiments will be apparent to the worker in the art.

What is claimed is:

1. An anti-vibration mount, said anti-vibration mount comprising:
 (a) a base, said base having a cavity extending from a top surface of said base toward the bottom of said base;
 (b) a core extending through said cavity and being coupled at its lower end to said base;
 (c) a connector having a head and a threaded end, said connector being coupled at its threaded end to said core by a threaded engagement and adapted to couple a part subject to vibration to said mount;
 (d) wherein said base cavity and said core are dimensioned to define a receptacle extending around said core between said core and the walls of said base cavity, said receptacle having a lower portion and an upper portion;
 (e) wherein said receptacle lower portion is substantially filled with lead;
 (f) a bushing received in the upper portion of said receptacle around said core, said bushing having a lower surface bearing on said lead and an upper bearing surface, said upper bearing surface being elevated above the top surface of said base and adapted to bear the load of said part; and (g) a resilient body carried around said connecter and, when said part is coupled to said mount, between said part and said connector head.

2. The anti-vibration mount of claim 1, wherein said resilient body is one or more Belleville washers.

3. The anti-vibration mount of claim 1, wherein said core is coupled to said base by a threaded engagement.

4. The anti-vibration mount of claim 2, wherein said core is coupled to said base by a threaded engagement.

5. The anti-vibration mount of claim 1, wherein said lead was provided by pouring molten lead into said receptacle lower portion.

6. The anti-vibration mount of claim 1, wherein said lead is a pre-formed lead bushing.

7. The anti-vibration mount of claim 3, wherein said threaded engagement between said base and said core is spot welded.

8. A chassis-mounted assembly of flowline components, assembly comprising:
 (a) a frame;
 (b) a plurality of flowline components joined by unions;
 (c) wherein at least one said component is coupled to said frame by the anti-vibration mount of claim 1.

9. The chassis-mounted assembly of claim 8, wherein said coupled component is mounted on a mounting plate and said mounting plate is coupled to said frame through said anti-vibration mount.

10. A chassis-mounted assembly of flowline components, assembly comprising:
 (a) a frame;
 (b) a plurality of flowline components joined by unions;
 (c) wherein at least one said component is coupled to said frame by the anti-vibration mount of claim 2.

11. The chassis-mounted assembly of claim 10, wherein said coupled component is mounted on a mounting plate and said mounting plate is coupled to said frame through said anti-vibration mount.

12. A chassis-mounted assembly of flowline components, assembly comprising:
 (a) a frame;
 (b) a plurality of flowline components joined by unions;
 (c) wherein at least one said component is coupled to said frame by the anti-vibration mount of claim 4.

13. The chassis-mounted assembly of claim 12, wherein said coupled component is mounted on a mounting plate and said mounting plate is coupled to said frame through said anti-vibration mount.

* * * * *

UNITED STATES PATENT AND TRADEMARK OFFICE
CERTIFICATE OF CORRECTION

| | | |
|---|---|---|
| PATENT NO. | : 11,619,326 B1 | |
| APPLICATION NO. | : 16/910769 | |
| DATED | : April 4, 2023 | |
| INVENTOR(S) | : Duy D. Nguyen, Mark J. Adamson and John M. Adamson | |

It is certified that error appears in the above-identified patent and that said Letters Patent is hereby corrected as shown below:

In the Specification

In Column 4, at Lines 46-47, delete "At least one the component", and insert therein -- At least one of the components --.

In Column 5, at Line 34, after "FIG. 9 is", insert -- a --.

In Column 8, at Line 9, delete "worker", and insert therein -- workers --.

In Column 9, at Line 13, delete "is", and insert therein -- it --.

In Column 10, at Line 24, delete "slide", and insert therein -- slid --.

In Column 10, at Line 36, delete "may be made may be made", and insert therein -- may be made --.

In the Claims

In Claim 8, Column 11, at Line 22, before "assembly", insert -- said --.

Signed and Sealed this
Ninth Day of May, 2023

Katherine Kelly Vidal
*Director of the United States Patent and Trademark Office*